United States Patent
Witter et al.

(10) Patent No.: US 8,514,090 B2
(45) Date of Patent: Aug. 20, 2013

(54) DUST LEVEL SENSOR ARRANGEMENT FOR DUST COLLECTION SYSTEM

(75) Inventors: Robert M Witter, Englewood, FL (US); Jeffrey Hill, Cicero, NY (US); John J Fitzsimmons, Clay, NY (US)

(73) Assignee: Oneida Air Systems Inc, Syracuse, NY (US)

( * ) Notice: Subject to any disclaimer, the term of this patent is extended or adjusted under 35 U.S.C. 154(b) by 218 days.

(21) Appl. No.: 12/940,106

(22) Filed: Nov. 5, 2010

(65) Prior Publication Data

US 2012/0112919 A1    May 10, 2012

(51) Int. Cl.
    *G08B 21/00*   (2006.01)
(52) U.S. Cl.
    USPC ........................................................ 340/612
(58) Field of Classification Search
    USPC ............... 340/612, 545.3, 555, 607; 73/1.45
    See application file for complete search history.

(56) References Cited

U.S. PATENT DOCUMENTS

| | | | | |
|---|---|---|---|---|
| 5,033,151 | A * | 7/1991 | Kraft et al. | 15/319 |
| 5,315,884 | A | 5/1994 | Kronberg | |
| 5,319,827 | A * | 6/1994 | Yang | 15/319 |
| 5,819,367 | A * | 10/1998 | Imamura | 15/339 |
| 6,029,309 | A * | 2/2000 | Imamura | 15/319 |
| 6,055,702 | A * | 5/2000 | Imamura et al. | 15/339 |
| 6,415,241 | B1 | 7/2002 | Yoshida | |
| 7,038,189 | B2 * | 5/2006 | Kawai | 250/222.2 |
| 7,492,272 | B1 * | 2/2009 | MacDonald | 340/618 |
| 8,312,593 | B2 * | 11/2012 | Hwang et al. | 15/352 |

OTHER PUBLICATIONS

Fargo Controls, Diffused—Direct Reflection Photoelectric Sensors, Jul. 2010.

* cited by examiner

*Primary Examiner* — Phung Nguyen
(74) *Attorney, Agent, or Firm* — Bernhard P. Molldrem, Jr.

(57) ABSTRACT

A level detector or sensor for a dust collection system has a threaded housing that seats in a penetration in the lid of a dust collection drum or other container, and can be adjusted mechanically in its mounting. The sensor has an adjustment to control the distance at which it picks up light off the collected material. An elongated flexible cable connects the sensor with an alarm strobe, which may be a low-power LED device, and can be positioned at a convenient location remote from the drum.

18 Claims, 2 Drawing Sheets

DUST LEVEL SENSOR ARRANGEMENT FOR DUST COLLECTION SYSTEM

BACKGROUND OF THE INVENTION

This invention is directed to devices and equipment for collecting bulk solids, for example, process dust coming from a dust generator, such as a sanding machine, wherein the dust is entrained in a flow of air from the source machine, and is separated out at a dust collection station where the dust falls into a dust collection container, e.g., drum or barrel. The invention is more specifically directed to a compact and efficient system for sensing whether the dust collection drum is filled or nearly filled with accumulated production dust, and alerting the operator so the drum can be properly emptied.

In any process equipment that involves filling drums, containers, silos, boxes, etc., there is a need for an indicator system to signal when capacity of the container (or a desired level within the container) has been reached. Without an indicator system operators are forced to monitor the levels manually, and can risk overfilling. In some cases, overfilling can cause major system failures, filter clogging, and costly downtime.

Many types of machines for processing a workpiece, require means to dispense with the grindings, chips, and particulate matter that is generated during operation. For example, in the case of wood working machines, such as sanders, joiners, and the like, wood that is removed from a workpiece has to be collected and removed from the work area because the dust creates a breathing hazard for the workman as well as a fire hazard. More specifically, in the case of portable equipment, such as floor sanders and edgers, it is conventional to draw off the dust that is generated by the machines and then send the air that is carrying the dust into a filter bag arrangement, or to draw off the dust through a flexible hose or conduit. In such case, the conduit or hose extends from a dust outlet duct of the machine to a collection station. A stream of air is pumped through the conduit, with the entrained process dust. An example of a dust collection system of this general type is shown in U.S. Pat. No. 6,833,016, which is incorporated herein by reference. The bulk solids collection drum may have a drum liner so that the collected dust descends into the liner, i.e., a plastic bag, for easy removal and disposal.

At the dust collection station, the air flow and entrained process dust are drawn through a cyclone separator situated above the dust storage drum or barrel. The process dust falls into a the film bag or liner in the barrel, and the air then proceeds to a pumping and filtering arrangement, where the dust-free air is discharged back into the ambient environment.

It is important that the dust collection drum, and/or any drum liner, be emptied out when it becomes filled or nearly filled. A fill detector of one type or another may be used so sense that the level of accumulated dust is nearing the top of the drum or barrel. One method of doing this has been to used a motorized rotary paddle wheel that can rotate freely until the upper level of the accumulated dust reaches the paddle wheel and slows or stops it. These devices have tended to be cumbersome and unreliable, and can cease to function for any of a number of mechanical reasons, including breakage of a paddle blade or vane. Rotating paddle type sensor switches rely on a rotating paddle that protrudes into the container. When the material level rises to cover the paddle, the movement of the paddle is impeded, and the switch closes. These devices are costly, have moving parts, and add complexity to the system. The devices also require a deep penetration into the container, which poses a problem for sensing level near the lid of the dust collection drum. When protruding through a drum lid, these paddle type sensors make the removal of the drum lid difficult, since the paddle is lodged down deep in the drum contents. With a limited clearance available, it can be difficult or impossible to use these sensors mounted in a drum lid. Paddle-type sensors are also fixed-depth, so changing to a different depth measurement requires mechanically changing the paddle or the shaft of the device.

Accordingly, there has been a need for a dust drum level detector that senses accumulated dust level without having to physically touch or move the dust, and which does not have moving parts that can break or fail. It is also desirable to provide a strong visible alert when the dust drum has become full, where the high sound level in the shop would make an audible alert difficult to hear.

OBJECTS AND SUMMARY OF THE INVENTION

Accordingly, it is an object of this invention to provide an efficient dust collection level detection and alert system that avoids the drawbacks of the prior art.

It is a more specific object to provide a dust collection system that reliably alerts an operator when the accumulated dust within the drum or barrel has reached a predetermined fill level, as detected by a level sensor.

It is a further object of this invention to provide a dust collection level detection arrangement that is reliable, efficient, inexpensive, and has a low energy draw.

According to an aspect of the invention, a dust collection system may be employed for collecting production dust from a source that generates such dust in a production operation. The dust is conveyed in a flow of air in which the dust is entrained, and then the dust is separated from the air and stored in a dust collection drum below the dust separator, or in a dust collection bag within the dust collection drum. The separator is mounted above the drum or barrel such that the dust entrained in the flow of air separates out and descends into the bag liner or into the drum. The flow of air then typically continues to a pump and filter arrangement that creates a negative pressure to induce the flow of air. At the pump and filter arrangement, the air is cleaned and is returned into the ambient as clean filtered air.

According to preferred embodiments of this invention, a dust level sensor arrangement is mounted into the lid of a dust collection drum. The sensor arrangement is sensitive to the level of an upper surface of the accumulated dust in the drum and is operative to alert an operator when the dust has risen to a predetermined level that indicates the drum is filled. A sensor mounted in a penetration in the lid generates radiation, e.g., infrared, that is directed downward into the drum and is reflected off the upper surface of the accumulated dust. The sensor provides an output signal that goes from one sense to another sense when the dust has reached said predetermined level. In a preferred sensor arrangement, the output level or output signal can go from an open to a closed condition to energize the associated strobe alarm. The strobe alarm is coupled to the sensor and is triggered by the output signal of the sensor to generate a visible strobe alert signal when the accumulated dust in the drum has reached the predetermined fill level.

In a preferred embodiment, the sensor is implemented as a diffuse infrared photoelectric sensor, with a tubular housing that has male threads, so that it adjustably mounts through a round penetration in the lid, and can be set at a desired position with use of two threaded retaining nuts. The sensor has a sensitivity adjustment that permits adjustment, within a range of e.g. 30 cm, of sensitivity of the distance from the sensor to the upper level of the dust. That is, the distance can be adjusted which the output goes from open to closed or vice versa. Preferably, the strobe alarm is coupled by a long, flexible cable to the sensor, and can be positioned at a convenient location fairly high on a wall, and remote from the dust collection drum. This permits the strobe alarm to be visible throughout the shop so the operator will be certain to be alerted when the dust drum becomes filled up. The strobe alarm may be provided with a power supply providing DC voltage through the cable to the sensor. The strobe alarm may also include a low-voltage DC-powered strobe device powered by the DC power supply. This may be a long-life LED based strobe device which operates on extremely low power.

In other embodiments, the strobe alarm arrangement may incorporate an audible alarm as well. An interactive arrangement may interface with the dust collection system to prevent it operating if the dust level is too high. Other types of level sensors may be used, such as visible light sensors and ultrasonic sensors. In the preferred embodiment, the sensor package employs an indicator light, i.e., a strobe light, but this could be easily modified to indicate with a buzzer or bell, or could be wired into an electrical or electronic control system to interact with the machinery. The strobe light employed in the preferred embodiment uses low-amperage LED technology and operates with a low-power transformer type power supply.

In the preferred embodiment, an available transformer power supply converts line voltage, i.e., 110/220 VAC to 12 volts DC to provide power for the sensor and for the strobe light. A diffuse infrared sensor, mounted in the dust drum lid, has an adjustable range, with the emitter(s) and receiver(s) mounted unitarily in one housing. This sensor is preferably configured normally-open, and closing when the dust level reaches a predetermined limit, but a normally-closed configuration could be used if desired. The sensor housing has a barrel configuration with external threading so it can be adjusted (with the retaining nuts) for a desired mounting height and/or penetration through the lid. A cable leading to the strobe assembly quickly connects and disconnects with the sensor. The sensor can be easily removed and replaced if damaged or if desired for any reason.

The strobe assembly, i.e., strobe box or light box incorporates the low-voltage strobe light, which can be mounted onto a small electrical junction box. This contains all the necessary wiring connections for power supply, switch and strobe light. The box provides mounting capacity for the light, and can be mounted in any desired, conspicuous location remote from the dust collection drum, and positioned optimally to give an optical cue to the operator that the bin or drum is full. The device can be wired easily to other indicators, or to controls for the machinery.

The above and many other objects, features, and advantages of this invention will become apparent from the ensuing detailed description of the preferred embodiments, which is illustrated in the accompanying Drawing.

DETAILED DESCRIPTION OF A PREFERRED EMBODIMENT

Figure 1:
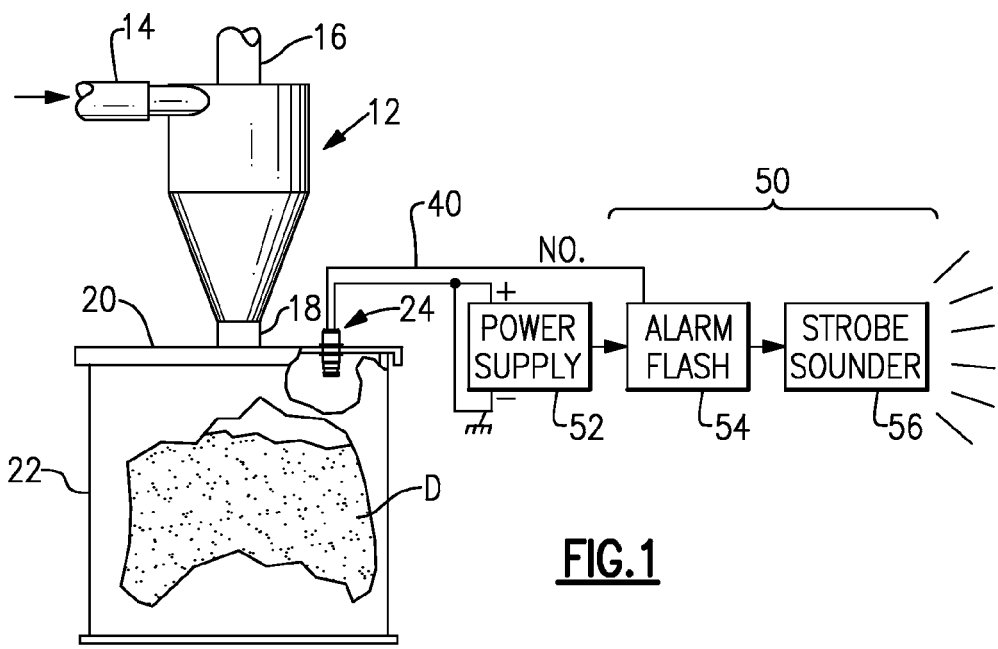
FIG. 1 is a schematic system view of a dust collection station employing a dust level sensor according to one embodiment of this invention.

Now with reference to the Drawing, FIG. 1 shows a dust collection system according to an embodiment of this invention in which dust is separated from the air flow coming from tool or machine, with the air being cleaned and returned to the ambient and with the dust being separated out from the air flow and allowed to descend through a lower end of the dust separator into a collection drum positioned beneath. The dust separator and dust collection drum may be located at some distance remote from the dust source.

At the dust collection station, a cyclonic separator 12 has an inlet pipe 14 which receives a stream of air and entrained dust. At an upper portion of the separator 12 there is an air exhaust port 16, and beneath the cone-shaped lower part there is a dust conduit 18 that extends downward from a nose of the separator. The cyclonic separator separates the dust out from the air flow and the dust then proceeds downward through a barrel closure plate or lid 20 into a dust collection drum or barrel 22. The drum typically has a base or bottom and a cylindrical side wall that extends upwards to a mouth or rim on which the lid 20 is supported. Any other suitable container could be substituted, which need not have a circular or cylindrical shape.

A bag or liner, favorably formed of a polyethylene film of nominal 4 mil thickness, may be situated in the drum 22. Process dust D, e.g., wood dust, accumulates in the barrel or drum 22 In this view, the side wall of the drum is shown partly cut away to illustrate the accumulation of the process dust D. The bag or liner can be tied off and lifted out when full. The independent stand-alone nature of the waste collection drum or barrel also allows for different size drums to be interchanged easily and cost effectively, accommodating the scope of the project and the volume of waste material to be collected. Different size liners are available to match the different size drums.

Exhaust air from the separator is carried via a conduit (not shown here) to an air pump and filter unit, where it can be exhausted, free of dust, to the atmosphere. The filtration of air and separation of dust vastly improves the industrial hygiene for the operators. The dust collection station can receive process dust from several dust sources at the same time.

Figure 2:
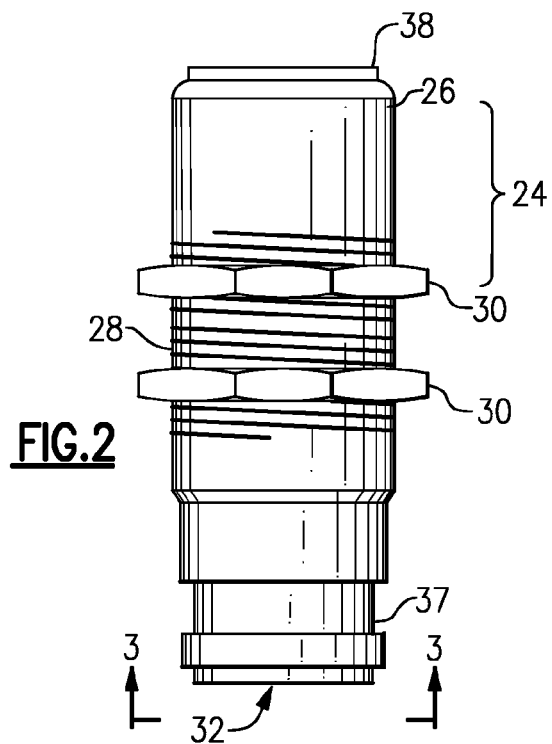
FIG. 2 is an elevation of the sensor device of this embodiment.
Figure 3:
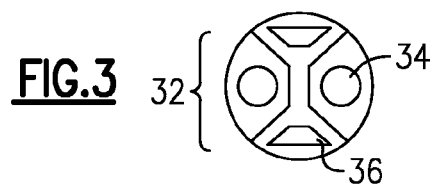
FIG. 3 is an end view taken at 3-3 of FIG. 2.

In this embodiment, the dust level sensor and alarm arrangement is implemented with a diffuse infrared sensor 24 that is mounted in a circular penetration in the lid 20 of the dust collection drum 22 and is oriented vertically downward. As shown in more detail in FIGS. 2 and 3, the sensor 24 has a housing in the form of an elongated tubular barrel 26, with external threading 28 that receives upper and lower retaining nuts 30. These nuts 30, with any additional washers and seal rings as needed, secure the sensor 24 into the drum lid 20, as shown in FIG. 1. A sensor head 32 at the lower end is directed downward, i.e., towards the collected dust D, as the upper surface of the dust D continues to rise gradually during operation. The sensor head 32 (see FIG. 3) has a plurality of infrared emitters 34 and receivers 36, positioned to face downward into the dust drum. The sensor 24 continues to emit radiation towards the drum, and the sensor receivers 36 can be adjusted to close a normally-open switch terminal when the dust upper surface is within a preset (but adjustable) distance from the sensor head 32. That is, in this configuration the switch terminal on the sensor 24 goes from an off condition or sense to an on or energized sense when the collected dust D rises above a "filled" level. An adjustment screw 37 allows the operator to adjust the distance from the head 32, i.e., below the head 32, at which the reflected illumination will be picked up and at which the sensor will switch from the one state (OFF) to the other (ON). This may have an adjustment range of up to 30 cm. A connector 38 is formed at the upper end of the sensor housing 26, and receives a jack connector from a multiple-conductor, elongated, flexible cable 40 (see FIG. 1).

The cable 40 connects to a strobe alarm assembly 50, which here is shown to include a low-voltage DC power supply 52. This may be internal or external, and in a preferred arrangement the power supply 52 is a low-power transformer that converts line or mains power (110 or 220 VAC) to low voltage (e.g., 12 VDC). In some implementations, battery power could be used here. This supplies + and − DC power, via the cable 40 to the diffuse infrared sensor 24, and also provides power to an alarm flash circuit 54 and a visible strobe 56. The cable 40 has a conductor that connects the normally-open or NO contact of the sensor 24 to the alarm flash circuit 54, such that when the sensor closes and imposes a voltage on that conductor, the alarm flash circuit 54 triggers the strobe 56. The flash circuit 54 may also provide signaling to the shop control electronics, and can be used to affect equipment operation, e.g., shutting off equipment power if the collected dust reaches or exceeds the full level.

Figure 4:
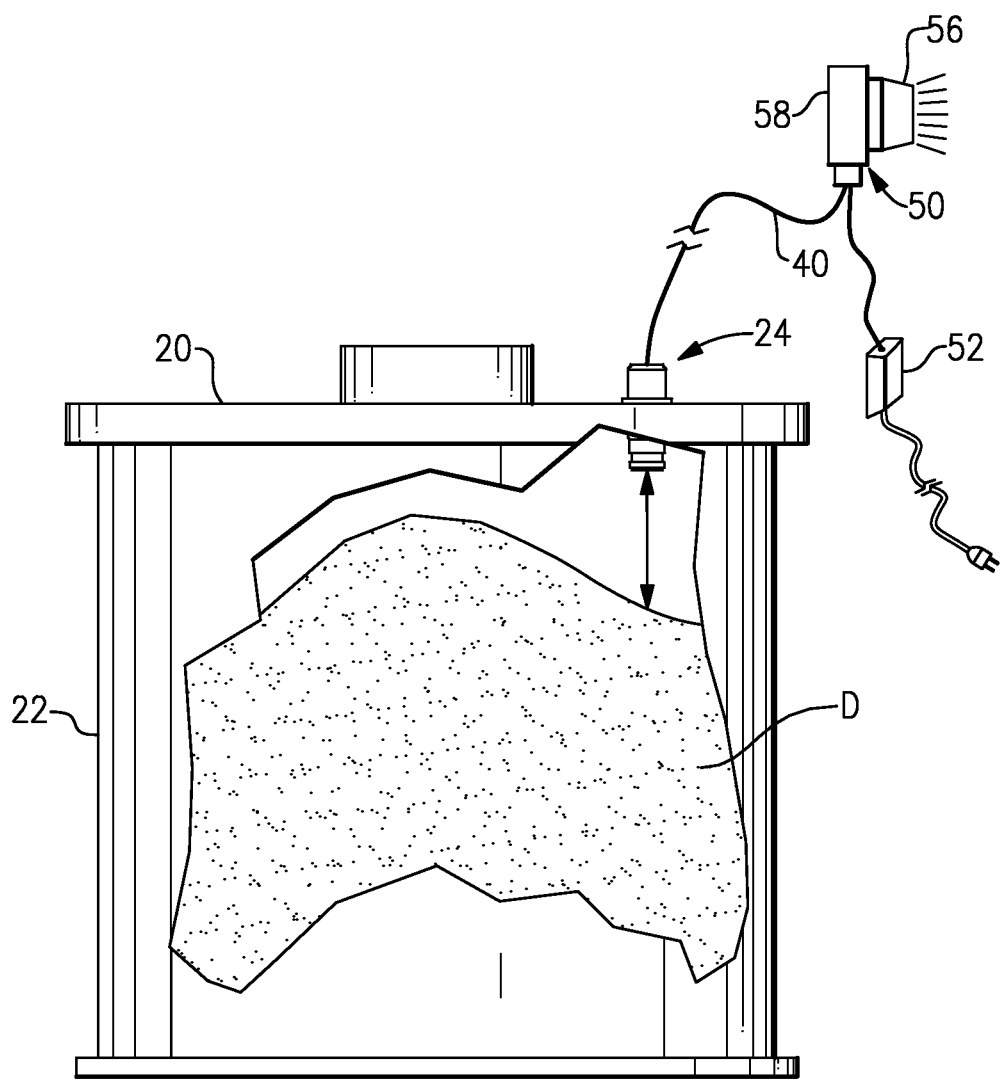
FIG. 4 is a general elevation view of this embodiment.

As shown in FIG. 4, the cable 40 may extend for some length, permitting the strobe alarm assembly 50 to be positioned a significant distance removed from the dust collection drum 22. Here, the strobe alarm assembly 50 is shown as having the visible, high-intensity, low-power strobe 56 mounted on an electrical box 58 which can serve as a housing for the assembly. This configuration permits the operator to mount the strobe alarm assembly high on a wall of the shop, or at another location where it can readily alert the operator when the dust D that has collected in the drum 22 has filled the drum to the preset limit. As mentioned before, a buzzer, sounder or other alarm may be used in place of the strobe, if suitable for a given application.

While the invention has been described hereinabove with reference to a few preferred embodiments, it should be apparent that the invention is not limited to such embodiments. Rather, many variations would be apparent to persons of skill in the art without departing from the scope and spirit of this invention, as defined in the appended Claims.

We claim:

1. Dust level sensor arrangement mounted into a lid of a dust collection container in which dust, that descends from a dust separator positioned above said lid, accumulates, and the dust level sensor arrangement being sensitive to the level of an upper surface of the accumulated dust in the container to alert an operator when the dust has risen to a predetermined level beneath said lid, the arrangement comprising
a sensor attached onto said lid generating radiation that is directed downward into the drum and is reflected off the upper surface of the accumulated dust, and providing an output signal that goes from one sense to another sense when the dust has reached said predetermined level, wherein said predetermined level is at a finite distance below said sensor such that said sensor output signal goes from said one sense to the other sense without the sensor actually touching the accumulated dust; and
a strobe alarm that is coupled to said sensor and is triggered by the output signal of the sensor to generate a visible strobe alert signal when said accumulated dust has reached said predetermined level in the container.

2. The dust level sensor arrangement according to claim 1 wherein said sensor includes a tubular housing that adjustably mounts through a penetration in said lid.

3. The dust level sensor arrangement according to claim 1 wherein said sensor includes a diffuse infrared photoelectric sensor.

4. The dust level sensor arrangement according to claim 3 wherein said sensor includes a sensitivity adjustment which permits adjustment within a range, of the distance from the sensor to the upper level of the dust at which the output signal goes from one sense to the other sense.

5. The dust level sensor arrangement according to claim 4 wherein said range is substantially 30 cm.

6. The dust level sensor arrangement according to claim 1 wherein said strobe alarm is coupled by a cable to said sensor, and is positionable at a location remote from said dust collection container.

7. The dust level sensor arrangement according to claim 6 wherein said strobe alarm includes a power supply providing DC voltage through said cable to said sensor.

8. The dust level sensor arrangement according to claim 7 wherein said strobe alarm includes a low-voltage DC-powered strobe device.

9. The dust level sensor arrangement according to claim 1, wherein said sensor is mounted in a penetration in said lid.

10. Dust level sensor arrangement mounted into an upper closure of a dust collection drum in which dust accumulates that descends from a dust separator positioned above said drum, and sensitive to the level of an upper surface of the accumulated dust in the drum to alert an operator when the dust has risen to a predetermined level beneath said upper closure, the arrangement comprising
a sensor attached onto said upper closure generating radiation that is directed downward into the drum and is reflected off the upper surface of the accumulated dust, and providing an output signal that goes from one sense to another sense when the dust has reached said predetermined level, wherein said predetermined level is a finite distance below said sensor such that the sensor output signal goes from said one sense to the other sense without the sensor actually touching the accumulated dust; and
an alarm arrangement that is coupled to said sensor and is triggered by the output signal of the sensor to generate an alert signal to alert an operator when said accumulated dust has reached said predetermined level in the drum.

11. The dust level sensor arrangement according to claim 10 wherein said alarm arrangement is coupled by an elongated flexible cable to said sensor, and is positionable at a location remote from said dust collection drum.

12. The dust level sensor arrangement according to claim 11 wherein said alarm arrangement includes a power supply providing DC voltage through said cable to said sensor.

13. The dust level sensor arrangement according to claim 10 wherein said sensor includes a diffuse infrared photoelectric sensor.

14. The dust level sensor arrangement according to claim 10 wherein said sensor permits adjustment within a range of substantially 30 cm of sensitivity of distance from the sensor to the upper surface of the accumulated dust.

15. The dust level sensor arrangement according to claim 10, wherein said sensor is mounted in a penetration in said upper closure.

16. A dust collection arrangement for collecting bulk solid production dust that is entrained in a flow of air from a source of said dust, wherein the flow of air passes through a cyclonic separator in which the dust is separated from the flow of air, the flow of air passes through a further stage and is returned to the ambient, and the separated dust falls into a dust collection station, away from said flow of air, in which the separated dust accumulates; with said collection station having a top closure with an opening through which the separated dust descends into the dust collection station; and comprising the improvement of a dust level sensor arrangement that is sensitive to the level of an upper surface of the accumulated dust within the dust collection station and operative to alert an operator when the upper level thereof has risen to a predetermined level beneath the top closure, the dust level sensor arrangement including a sensor, attached onto said top closure, generating radiation that is directed downward from said top closure and is reflected off the upper surface of the accumulated dust, and providing an output signal that goes from one sense to another sense when the dust has reached said predetermined level, wherein said predetermined level is a finite distance below said sensor such that the sensor output signal goes from said one sense to the other sense without the sensor actually touching the accumulated dust; and an alarm arrangement that is coupled to said sensor and is triggered by the output signal of the sensor to generate an alert signal to alert an operator when said accumulated dust has reached said predetermined level in the drum.

17. The dust collection arrangement according to claim 16 wherein said sensor is mounted in a penetration in said top closure.

18. The dust collection arrangement according to claim 16 further comprising an interface arrangement coupled to said cyclonic separator to prevent operation of said cyclonic separator when the sensor detects that the dust has reached said predetermined level.

\* \* \* \* \*